(12) United States Patent
Mandel et al.

(10) Patent No.: US 6,521,258 B1
(45) Date of Patent: *Feb. 18, 2003

(54) POLYMER MATRICES PREPARED BY SUPERCRITICAL FLUID PROCESSING TECHNIQUES

(75) Inventors: Frederick S. Mandel, Chagrin Falls, OH (US); J. Don Wang, Brecksville, OH (US)

(73) Assignee: Ferro Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/658,251

(22) Filed: Sep. 8, 2000

(51) Int. Cl.$^7$ .............................. A61K 9/14; A61K 9/16
(52) U.S. Cl. ...................... 424/484; 424/486; 424/489; 424/490; 424/497
(58) Field of Search ................... 424/484, 489, 424/490, 497, 486

(56) References Cited

U.S. PATENT DOCUMENTS

| | | | |
|---|---|---|---|
| 5,082,803 A | 1/1992 | Sumita | |
| 5,399,597 A | * 3/1995 | Mandel et al. | 523/342 |
| 5,424,076 A | * 6/1995 | Gorissen et al. | 424/501 |
| 5,548,004 A | 8/1996 | Mandel et al. | |
| 5,554,382 A | * 9/1996 | Castor | 424/450 |
| 5,698,163 A | 12/1997 | Mandel | |
| 5,766,637 A | * 6/1998 | Shine et al. | 424/497 |
| 5,851,453 A | * 12/1998 | Hanna et al. | 264/5 |
| 5,874,029 A | * 2/1999 | Subramaniam et al. | 264/12 |
| 5,989,289 A | 11/1999 | Coates et al. | |
| 5,993,747 A | 11/1999 | Mandel | |
| 6,005,162 A | 12/1999 | Constantz | |
| 6,054,103 A | 5/2000 | Mandel | |

FOREIGN PATENT DOCUMENTS

WO  WO98/51347  11/1998

OTHER PUBLICATIONS

U.S. patent applications Ser. No. 09/315,616, Mandel filed May 20, 1999.
F. Mandel, Manufacturing of Specialty Materials in Supercritical Fluid Carbon Dioxide, Inorganica Chimica Acta 294 (1999) 214–223.
K. Uhrich, Polymeric Systems for Controlled Drug Release, Journal of the American Chemical Society (1999).

* cited by examiner

Primary Examiner—Thurman K. Page
Assistant Examiner—S. Tran
(74) Attorney, Agent, or Firm—Rankin, Hill, Porter & Clark LLP

(57) ABSTRACT

Polymer matrices for use in orthopedic, pharmaceutical, and similar mixtures are prepared by mixing two or more polymers and a process medium in a reactor to form a supercritical fluid slurry. The process medium preferably is carbon dioxide which is supplied to the reactor in a supercritical state or which is heated and pressurized in the reactor to attain a supercritical state. After mixing for a period of time, the slurry either is left in the reactor or is discharged into a receiving vessel. The process medium is separated from the polymers and removed, leaving behind finely divided particles.

23 Claims, 1 Drawing Sheet

POLYMER MATRICES PREPARED BY SUPERCRITICAL FLUID PROCESSING TECHNIQUES

BACKGROUND OF THE INVENTION

1. Field of the Invention

The invention relates to the use of supercritical fluid processing techniques to prepare polymer matrices suitable for use in orthopedic, pharmaceutical, and similar applications.

2. Reference to Related Patent Applications

Reference is hereby made to two concurrently filed patent applications filed by the inventors hereof, said applications being titled "Orthopedic Mixtures Prepared by Supercritical Fluid Processing Techniques," application Ser. No. 09/658,252, and "Controlled-Release Pharmaceuticals Prepared by Supercritical Fluid Processing," application Ser. No. 09/658,249, the disclosures of which are incorporated herein by reference. These applications will be referred to herein as the "Orthopedic Mixtures Patent" and the "Pharmaceutical Mixture Patent."

3. Description of the Prior Art

There is a continuing need for high-strength orthopedic mixtures that can be used as bone filler, bone grafts, and the like. Similarly, there is a need for high quality pharmaceuticals, particularly pharmaceuticals whose active ingredient can be released slowly over an extended period of time. The Orthopedic Mixtures Patent and the Pharmaceutical Mixture Patent disclose and claim improvements in the manufacture of orthopedic mixtures and pharmaceutical mixtures that are brought about by the use of supercritical fluid processing techniques. Generally speaking, each of these inventions involves the discovery that an improved product can be made by (1) mixing desired ingredients in a reactor with a process medium that is, or can be made to become, a supercritical fluid, (2) mixing the ingredients in the reactor under supercritical fluid conditions to form a supercritical fluid slurry, and (3) releasing the pressure in the reactor in a controlled manner or discharging the reactor contents into a receiving vessel in a controlled manner. The resultant product is finely divided, porous particles that can be used in orthopedic or pharmaceutical applications.

In the case of the Orthopedic Mixtures Patent, a source of calcium ions such as tribasic calcium phosphate or hydroxyapatite is mixed with a polymer such as poly-$\epsilon$-caprolactone (PCL) and a supercritical fluid such as carbon dioxide to form a porous, strong material that can be carved, molded, or poured into a suitable shape. The polymer forms a matrix that provides support and structure for the calcium ions. The polymer is biosorbable, so that a porous calcium structure that simulates autogenic bone will be left in the body.

In the case of the Pharmaceutical Mixture Patent, a biologically active ingredient such as an antibiotic is mixed with a polymer such as PCL or polylactide-co-glycolide (PLGA) and a supercritical fluid such as carbon dioxide to form porous polymer particles that are infused with the biologically active ingredient. In a manner analogous to the Orthopedic Mixtures Patent, the polymer forms porous particles that provide a matrix, or carrier, for the biologically active ingredient. The characteristics of the polymer are such that the active ingredient will be released slowly into the patient over time through delayed dissolution or controlled diffusion. In each of these inventions, the process conditions, particularly the temperature of the ingredients, the mixing time, and the manner in which (1) the supercritical fluid is released from the reactor or (2) the slurry is discharged from the reactor can be varied to control the size of the particles and the porosity thereof. Variations in the sizes of the particles and their porosity control the performance characteristics of the resultant products.

Despite the advances of the Orthopedic Mixtures Patent and the Pharmaceutical Mixture Patent, there remains a need for a polymer matrix suitable for orthopedic uses, pharmaceutical uses, and similar uses that has superior strength characteristics. The need for a high strength polymer matrix for orthopedic applications is apparent. Although the need for a high strength polymer matrix is less obvious in the pharmaceutical field, such a product is very important. This is because degradation of the polymer can have an undesirable effect on the release rate of the active ingredient carried by the polymer. Further, strength characteristics of the polymer are important when the pharmaceutical product is provided in such form as a tablet.

Desirably, a polymer matrix would be known that could be used to produce high strength orthopedic and pharmaceutical mixtures. Any such polymer matrix preferably would meet or exceed the performance characteristics of existing polymer matrices as described in the Orthopedic Mixtures Patent and the Pharmaceutical Mixture Patent. Any such polymer matrix desirably would be very easy to manufacture.

SUMMARY OF THE INVENTION

In response to the foregoing concerns, the present invention provides a new and improved polymer matrix and a process for its manufacture that can be used to make high strength orthopedic and pharmaceutical mixtures. Essentially, the invention involves the discovery that a polymer matrix having strength gains of several.orders of magnitude can be produced by blending, or alloying, known polymers. The resultant polymer matrices are homogeneous, have enhanced strength, and are not fractionated or degraded.

Polymer matrices according to the invention are prepared by charging a reactor with starting materials that include two or more polymers. A process medium is added to the reactor. The process medium preferably is carbon dioxide which is supplied to the reactor in a supercritical state or which is heated and pressurized in the reactor to attain a supercritical state. The heated and pressurized ingredients are mixed in the reactor for a period of time sufficient to form them into a homogeneous, gas-saturated suspension, or supercritical fluid slurry. After the ingredients have been mixed adequately, the slurry either is left in the reactor or is discharged into a receiving vessel where the process medium is separated from the remainder of the materials and removed, leaving finely divided particles behind.

DESCRIPTION OF THE PREFERRED EMBODIMENT

Figure 1:
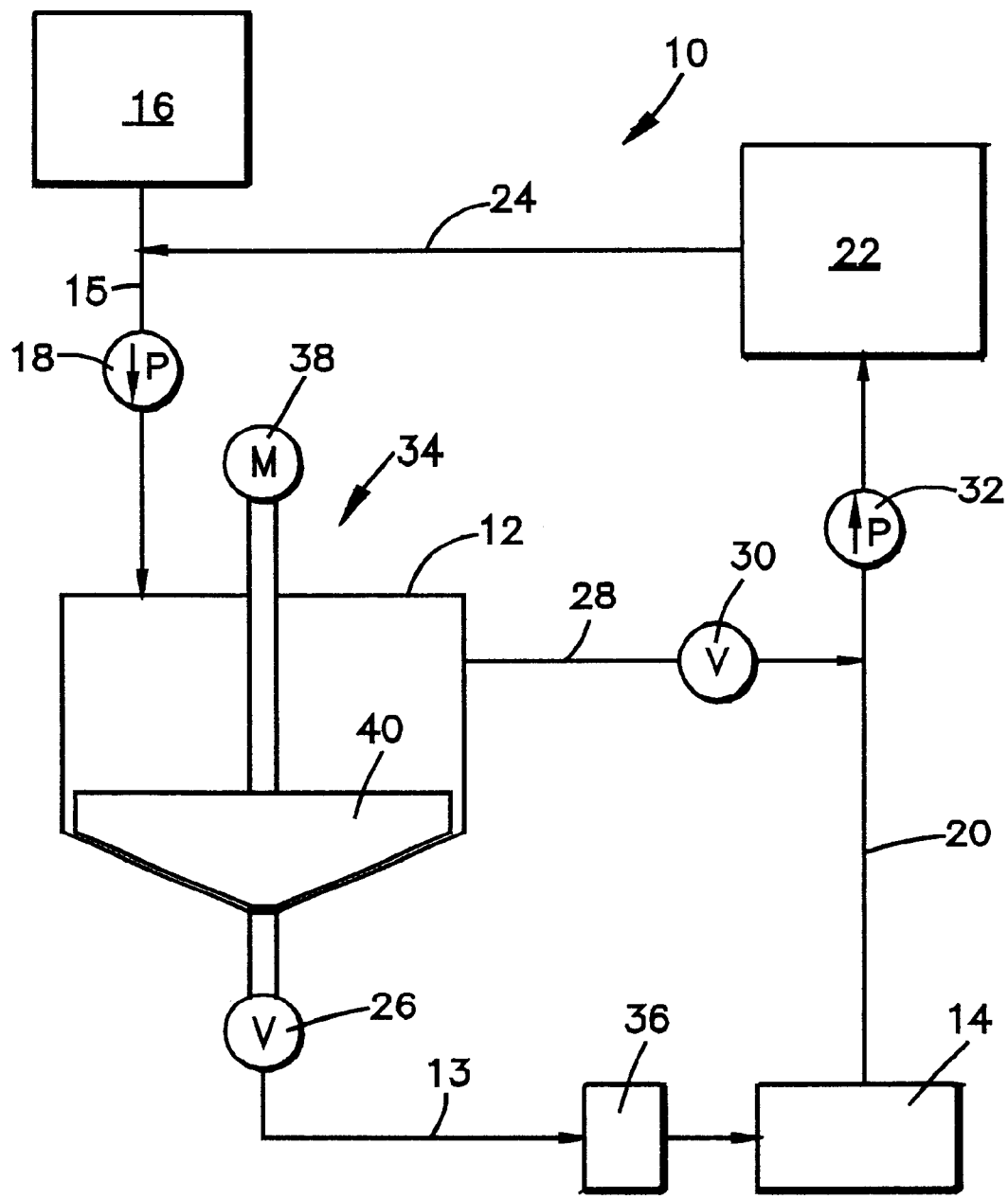
FIG. 1 is a schematic view of apparatus suitable for practicing the present invention.

Referring now to FIG. 1, apparatus for practicing the present invention is indicated generally by the reference numeral 10. The apparatus 10 is described in U.S. Pat. No. 5,399,597, entitled Method of Preparing Coating Materials, issued Mar. 21, 1997 to Frederick S. Mandel, et al. Reference also is made to U.S. Pat. No. 5,399,597, entitled Method of Preparing Coating Materials, issued Mar. 21, 1995 to Frederick S. Mandel, et al. Reference also is made to U.S. Pat. No. 5,698,163, entitled Control System for Processes Using Supercritical Fluids, issued Dec. 16, 1997 to Frederick S. Mandel, for a description of a control system for the apparatus 10. Additional details of the apparatus 10 can be found in U.S. Pat. No. 6,054,103, entitled Mixing System for Processes Using Supercritical Fluids, issued to Frederick S. Mandel; U.S. application Ser. No. 09/315,616, entitled Delivery System for Processes Using Supercritical Fluids, filed May 20, 1999 by Frederick S. Mandel; and U.S. Pat. No. 5,993,747, entitled Mixing System for Processes Using Supercritical Fluids, issued Nov. 30, 1999 to Frederick S. Mandel. The disclosures of all of the patents and applications referred to in this paragraph are incorporated in the present specification by reference.

The invention will be described generally in the context of making controlled-release pharmaceuticals, although it is to be understood that the principles of the present invention are applicable to the manufacture of orthopedic mixtures or any mixture wherein a polymer performs the role of a matrix and the strength of the matrix is of concern. Continuing to refer to FIG. 1, the apparatus 10 includes a reactor 12 that is connected by conduit 13 to a receiving vessel 14. A conduit 15 connects the reactor 12 to a source 16 of a process medium such as liquid carbon dioxide. The process medium preferably is fed under pressure into reactor 12 using a compressor or liquid pump 18. The receiving vessel 14 is connected by conduit 20 to a return tank 22. The return tank 22 is connected by conduit 24 to the source 16 of the process medium.

Reactor 12 includes, preferably at its base, a valve 26 for facilitating the emptying of the contents of the reactor 12 into the receiving vessel 14. A conduit 28 connects the top portion of the reactor 12 to conduit 20. A control valve 30 is included in conduit 28. A compressor 32 is included in conduit 20. Compressor 32 compresses and transfers gas emanating from the reactor 12 or the receiving vessel 14 into the return tank 22.

Reactor 12 includes a sealable opening or access port (not shown) that permits material to be charged into the reactor 12. Reactor 12 also includes a mechanical stirring device 34 for mechanically agitating and stirring the contents of reactor 12 so as to form a homogeneous mixture. Preferably, the access port is equipped with a quick-opening, breech-lock system that requires no hand tools to open and close. Also, reactor 12 preferably includes a feed port having a valve (not shown) that facilitates the quick addition of minor amounts of material (e.g., polymer) to the reactor 12 once it has been pressurized.

Reactor 12 and receiving vessel 14 preferably are made of stainless steel. However, it will be appreciated that a number of alternative materials may be utilized, such as, for example, nickel-coated carbon steel or carbon steel vessels having chemically inert inserts or liners. A particularly desirable reactor 12 is shown in U.S. Pat. No. 6,054,103, referred to previously.

The length of conduit 13 is minimized as much as possible. Conduit 13 can be in the form of a constant-diameter tubing. Alternatively, an orifice can be disposed in the conduit 13 just prior to receiving vessel 14. In another alternative, a header 36 can be disposed in conduit 13 just prior to receiving vessel 14. The header 36 includes a nozzle having multiple openings through which the homogeneous mixture is sprayed. Any number of nozzle openings may be employed to spray the slurry. Of course, it will be appreciated that the selection of the proper nozzle will be a function of various parameters, such as, for example, the pressure employed in reactor 12, the size of particles and flow rates desired, and the starting materials and process medium being used.

Typically, an orifice in the conduit 13 or the openings in a spray nozzle in the header 36 have a diameter of from about 0.001 inch to about 1 inch, preferably from about 0.005 inch to about 0.5 inch, and more preferably from about 0.01 inch to about 0.1 inch. Examples of suitable spray nozzles are hydraulic atomizing nozzles sold by Spraying Systems Co. of Wheaton, Ill. Reference is made to application Ser. No. 09/315,616, referred to previously, for a disclosure of a particularly desirable control valve 26 and header 36.

Mechanical stirring device 34 comprises an electric motor 38 that drives a mixer 40. Mixer 40 may comprise any number of conventional mixing devices. The selection of the proper mixer will be a function of various parameters, such as, for example, the size of motor 38, the materials being mixed, the configuration of the reactor 12, the process medium being utilized and the pressure employed in vessel 12. An example of a suitable mixer 40 is a Cowles blade mixer sold by Indco, Inc. of New Albany, Ind. Reference is made to U.S. Pat. No. 6,054,103, referred to previously, for a disclosure of a particularly effective mixer 40. It will be appreciated that the present invention preferably provides for both distributive and dispersive mixing.

Apparatus 10 is employed in accordance with the present invention by first charging the starting materials for the pharmaceutical that one desires to produce into the reactor 12. Reactor 12 then is sealed and isolated. The process medium from source 16 then is fed into reactor 12 via conduit 15 until a suitable quantity has been introduced into reactor 12. A critical temperature can be attained by heating reactor 12, heating the liquid/gas stream as it enters reactor 12, by agitating reactor 12, or by combinations of these techniques. The pressure and temperature in reactor 12 converts the process medium into a supercritical fluid.

Reactor 12 is maintained at an internal temperature of about −85° C. to about 200° C. When utilizing $CO_2$ as a process medium, a temperature of about 15° C. to about 160° C. is employed, and preferably about 20° C. to about 150° C., and more preferably about 31° C. to about 100° C. The particular temperature utilized will be a function of various variables such as, for example, the gas utilized, the composition of the starting materials, the pressures employed and equipment configurations. Pressure from about 350 psi to about 20,000 psi may be utilized. When employing a gas such as $CO_2$, a pressure of about 550 psi to about 7000 psi is utilized, and preferably about 950 psi to about 5000 psi, and more preferably about 1080 psi to about 4500 psi. The particular pressure utilized will be a function of such variables as the temperature of the reactor 12 and the particular process medium utilized.

Once reactor 12 has been heated and pressurized, motor 38 is energized and the starting materials and the supercritical fluid are thoroughly mixed to form a homogeneous, gas-saturated suspension, otherwise referred to as a supercritical fluid slurry. Preferably, reactor 12 is held below the melting point of the materials being processed. The temperature in reactor 12 preferably is in the range of from about 5 degrees below the $T_g$ (i.e., glass transition temperature) of at least one of the materials being processed up to about the melting point of such one material. In the case of an amorphous material, "melting point" means the temperature at which the material become wholly fluid. It is believed that a supercritical fluid will suppress the $T_g$ of most materials. In order to attain the desired temperature in reactor 12, reactor 12 may be equipped with heat exchangers or other suitable heating/cooling means.

The starting materials are mixed in reactor 12 for a period of about 1 to about 480 minutes, preferably about 5 to about 300 minutes and more preferably from about 30 to about 240 minutes. The viscosity of the supercritical fluid slurry is a function of the temperature and the density of the process medium. Once the starting materials have been thoroughly mixed, valve 26 is opened rapidly to minimize the pressure drop at valve 26. The pressurized supercritical fluid pushes the slurry out of the reactor 12. Valve 26 is maintained in the open position until such time as receiving vessel 14 (which is maintained at a lower pressure than reactor 12) has been filled and reactor 12 has been emptied of its contents. It has been found that best results are obtained if the flow within conduit 13 upstream of the header 36 is entirely laminar. Once receiving vessel 14 has been filled and substantially all of the starting materials have been transferred, valve 30 is opened in order to depressurize reactor 12 and permit the flow of gaseous process medium into return tank 22. The recycled process medium is made available for purposes of reuse by being transferred via conduit 24 to conduit 15.

While the slurry is being transferred to receiving vessel 14, receiving vessel 14 is held at a constant pressure. Preferably the pressure in receiving vessel 14 is lower than that in the reactor 12 so that the slurry enters receiving vessel 14 at a very high rate. Receiving vessel 14 is maintained at a starting temperature of about −85° C. to about 220° C., preferably about −18° C. to about 160° C., and more preferably about 0° C. to about 1300° C. As with reactor 12, in order to maintain the desired temperature in receiving vessel 14, heat exchangers or other cooling/heating devices may be necessary. Preferably, receiving vessel 14 is maintained at a temperature below the melting point of the materials being processed. Receiving vessel 14 is maintained at a pressure of about 0 psi to about 5000 psi, preferably about 100 psi to about 2000 psi, and more preferably about 150 psi to about 1000 psi. The particular pressure and temperature utilized in receiving vessel 14 are a function of various variables, such as the particular process medium utilized and the composition of the starting materials.

The present invention uses a process medium that is capable of achieving a supercritical state. As used herein, the phrase "supercritical fluid" means a material that at specific temperatures and pressures no longer displays the properties of either a gas or a liquid. Examples of potential supercritical fluids suitable for use with the present invention include carbon dioxide, water, nitrous oxide, methane, ethane, ethylene, propane, pentane, benzene, methanol ethanol, isopropanol, various fluorocarbons such as cholrotrifluoromethane and monofluoromethane, toluene, pyridine, cyclohexane, decalin, cyclohexanol, o-xylene, and tetralin. The critical properties for these compounds are set forth below. The present invention contemplates the use of these compounds either by themselves or in combination. Additionally, it will be appreciated that solvents such as acetone, ketones, or ethers may be utilized in conjunction with the compounds listed below. Generally, however, the use of such solvents is not desired, particularly for pharmaceuticals.

| Compound | Critical Temperature (° C.) | Critical Pressure (atm) |
| --- | --- | --- |
| $CO_2$ | 31.3 | 72.9 |
| $H_2O$ | 374.15 | 218.3 |
| $N_2O$ | 36.5 | 71.7 |
| Methane | −82.1 | 45.8 |
| Ethane | 32.28 | 48.1 |
| Ethylene | 9.21 | 49.7 |
| Propane | 96.67 | 41.9 |
| Pentane | 196.6 | 33.3 |
| Benzene | 288.9 | 48.8 |
| Methanol | 240.5 | 78.9 |
| Ethanol | 243.0 | 63.0 |
| Isopropanol | 235.3 | 47.0 |
| Isobutanol | 275.0 | 42.4 |
| Chlorotrifluoromethane | 28.0 | 38.7 |
| Monofluoromethane | 44.6 | 58.0 |
| Toluene | 320.0 | 40.6 |
| Pyridine | 347.0 | 55.6 |
| Cyclohexane | 280.0 | 40.2 |
| Decalin | 391.0 | 25.8 |
| Cyclohexanol | 356.0 | 38.0 |
| o-Xylene | 357.0 | 35.0 |
| Tetralin | 446.0 | 34.7 |

One compound that is particularly well suited for use with the present invention is carbon dioxide ($CO_2$). Carbon dioxide is preferred because it is non-toxic, nonflammable, reasonably priced, and is easily separated or removed from the constituents used in making pharmaceuticals at the contemplated temperatures and pressures. Therefore, there will be no residual $CO_2$ in the finished products that could contribute to toxicity problems when contacted by a patient. Also, the critical temperature of $CO_2$ is sufficiently low that the biologically active materials used in the process will not be affected adversely.

Although various process media may be used to produce pharmaceuticals in accordance with the principles of the present invention, care must be taken not to utilize starting materials that are soluble in the process medium at operating temperatures and pressures. If the starting materials are soluble in the process medium, it will not be possible to transfer the starting materials to the receiving vessel 14 without losing some of the starting materials to the storage tank 22, which would be a very undesirable result.

Starting materials that are used in the present invention are polymers that have a low melting temperature and which are capable of being formed into microscopic particles having suitable porosity to accept a biologically active material. Because the pharmaceuticals produced by the present invention are intended for use in the human body, potentially harmful additives such as pigments, flow control agents, extenders, and the like should not be used. Categories of acceptable polymers are thermoplastic, thermoset, or a combination of both. Polymers suitable for use in controlled drug release are discussed in K. Ulrich, et al., Polymeric Systems for Controlled Drug Release, Journal of the American Chemical Society (1999)("the Polymer Article"). It is believed that such polymers are suitable for use with the present invention. As noted in the Polymer Article, categories of suitable polymers include polyesters, polyorthoesters, polyanhydrides, polyamides, and phosphorous-containing polymers. It has been found that hydroxy-methyl cellulose and derivative-type polymers (e.g., hydroxy propyl cellulose) and polylactide-co-glycolide (e.g., Medisorb 8515 DL High I.V.) function well as part of the present invention. Other suitable polymers as specified in the Polymer Article include polyethylene, polypropylene, polyvinyl chloride, polyvinyl alcohol, polyethylene-vinyl acetate, polyenol-ketone, polyacrylic acid, polycarbophil, polyacrylamides, poly-N-isopropyl acrylamide, polyacrylates, polyethylene glycol, polyglycolic acid, polylactic acid, poly-$\epsilon$-caprolactone, poly-3-hydroxybutyrate, polyortho esters, polyanhydrides, polyamino acids, pseudo-polyamino acids, polyamide-enamines, polyamido amines, polyurethanes, azopolymers, polydimethylsiloxane, and polyphosphazenes.

Biologically active ingredients suitable for use with the present invention include inorganic or organic molecules, peptides, proteins, oligosaccharides, carbohydrates, nucleic acids, steroidals, and small molecules. The biologically active ingredients can include compounds that treat the following:

1. Infections: antiviral drugs, antibacterial drugs, antifungal drugs, and anthelmintics.
2. Cardiovascular system: positive inotropic drugs, diuretics, anti-arrhythmic drugs, beta-adrenoceptor blocking drugs, calcium channel blockers, sympathomimetics, anticoagulants, anti-platelet drugs, fibrinolytic drugs, and lipid-lowering drugs.
3. Gastro-intestinal system: antacids, antispasmodics, ulcer-healing drugs, anti-diarrhoeal drugs,.and laxatives.
4. Central nervous system: hypnotics and anxiolytics, anti-psychotics, antidepressants, central nervous system stimulants, appetite suppressants, drugs used to treat nausea and vomiting, analgesics, anti-epileptics, drugs used in parkinsonism, and drugs used in substance dependence.
5. Malignant disease and immunosuppresion: cytotoxic drugs, immune response modulators, and sex hormones and antagonists of malignant diseases.
6. Respiratory system: bronchodilators, corticosteroids, cromoglycate and related therapy, antihistamines, respiratory stimulants, pulmonary surfactants, and systemic nasal decongestants.
7. Musculoskeletal and joint diseases: drugs used in rheumatic diseases, and drugs used in neuromuscular disorders.
8. Immunological products and vaccines.

Pharmaceuticals produced in accordance with the present invention can be fabricated into tablets, powders, granules, capsules, suppositories, pessaries, colloidal suspensions, matrices, gels, micro-particles, monoliths, pastes, and creams. The pharmaceuticals can be administered by pulmonary, oral, rectal, parenteral, epicutaneous, or mucosal routes. Delivery of active ingredients may be accomplished via a series of methods including modified release via polymer biosorption or enhanced release via extended surface area. Active drugs have been placed in biosorption matrices at as little as 0.5% to 99%. The levels have been modified to below percolation threshold to well above. For the high threshold materials, many of the materials have from 25 to 100% pore interconnectivity which provides an additional mechanism for drug release.

When $CO_2$ gas is utilized as a process medium, $CO_2$ is charged to or utilized in reactor 12 so as to provide from about 1.0% by weight to about 99.0% by weight $CO_2$ and from about 99.0% by weight to about 1.0% by weight starting materials, preferably from about 20% by weight to about 80% by weight $CO_2$ and from about 80% by weight to about 20% by weight starting materials, and more preferably from about 40% by weight to about 60% by weight $CO_2$ and from about 60% by weight to about 40% by weight starting materials. After processing, the materials in receiving vessel 14 are a collection of homogeneous, uniformly sized particles. In the unlikely event that any oversize particles or an agglomeration of particles (foam) are contained in receiving vessel 14, the product must be rejected.

The amount of carbon dioxide absorbed and hence the amount of polymer swelling is proportional to temperature and pressure. For an amorphous polymer system the swelling could be as much as 66% or greater. This swelling leaves a large void volume within the polymer. As the polymer is reduced to ambient conditions, the rate of degassing or depressurization can influence the pore size of the particles as well as the size of the particles themselves. The depressurization is accomplished by way of controlled release from the receiving vessel 14 and a variable rate can be set. The density of the swollen polymer usually is equalized to that of the supercritical fluid density of the process medium. This permits the starting materials to be suspended in a mixture of equivalent density. If atomization is carried out, a range of materials can be produced that possess high surface areas with relatively low surface areas as well. The high surface area materials will give an immediate dosage of the biologically active material whereas the low surface area materials will require significant biosorption before release of the biologically active material to the host system. Rapid or slow degassing of the mixture can further induce additional control of the formulation's release characteristics.

Although the apparatus 10 has been described as including various components downstream of the reactor 12 such as the conduit 13, receiving vessel 14, flush valve 26, etc., it is possible to produce acceptable product according to the invention without any such components. Suitable product can be prepared merely by mixing the supercritical fluid slurry in the reactor 12 and then releasing the internal pressure in a controlled manner. However, use of the components downstream of the reactor 12, particularly orifices or nozzles in the conduit 13, enables accurate control of particle size and pore size to be attained more easily. Because the particle size and pore size can be controlled accurately, pharmaceuticals having predictable, desired characteristics can be produced easily. Typically, pore sizes will range between 1–400 microns, with 300–400 microns being preferred.

The following Examples describe a method of producing polymer matrices within the scope of the present invention. Except as noted, the apparatus used in the following Examples employed the reactor 12, but did not include downstream components such as the flush valve 26, conduit 13, or receiving vessel 14. Unless otherwise indicated, all parts and percentages are by weight and all temperatures are in degrees Centigrade (° C.).

EXAMPLE 1

Four hundred eighty (480) grams of Poly-ϵ-caprolactone (PCL) and one hundred twenty (120) grams of Polyvinal Alcohol (PVA) were premixed and charged into a one-gallon reactor 12. Reactor 12 was filled with 5.4 pounds of liquid $CO_2$ from source 16. The source 16 of $CO_2$ is a standard commercial source maintained at a temperature of about −18° C. and a pressure of about 300 psi. The reactor 12 was heated to 38° C. at a pressure of 2050 psi, thereby rendering the $CO_2$ a supercritical fluid. The starting materials and supercritical fluid were maintained under these conditions while being mixed, for 60 minutes using agitation device 34. The mixer 40 was rotated at a rate of 200 rpm. After 60 minutes, the temperature was raised to 65° C. resulting in a pressure of 3700 psi. The contents were stirred for another 30 minutes before the $CO_2$ was released and pressure returned to ambient. A homogeneous polymer blend was produced.

The experiment was repeated to vary the proportion of the starting materials. In one experiment, the starting materials consisted of 95% PCL and 5% PVA. In another experiment, the starting materials consisted of 67% PCL and 33% PVA. Acceptable product was produced in each experiment.

Suitable material ranges for the polymer starting materials are 1–99% for a given polymer and 1–99% for the other polymer. The pressure in the reactor 12 can be varied between 290–14,500 psi, the temperature can vary between 0–127° C., and the mixing rate can vary between 1–200 rpm.

EXAMPLE 2

The process of the invention can be used to produce mixtures suitable for orthopedic applications. The polymer blend from Example 1 was pulverized and mixed with hydroxyapatite (HA) in a ratio of 70% polymer alloy to 30% HA. The mixture was charged into a one-gallon reactor 12. Reactor 12 was filled with 5.5 pounds of liquid $CO_2$ from source 16. The reactor 12 was heated to 38° C. at a pressure of 1600 psi, thereby rendering the $CO_2$ a supercritical fluid. The starting materials and supercritical fluid were maintained under these conditions while being mixed for 60 minutes using agitation device 34. The mixer 40 was rotated at a rate of 145 rpm. After 60 minutes, the temperature was raised to 65° C. resulting in a pressure of 3000 psi. The contents were stirred for another 10 minutes at 142 rpm before the $CO_2$ was released and pressure returned to ambient. Water was turned on to cool the system as the $CO_2$ was released. The product of this experiment possessed much greater mechanical strength than similar products that employed only a single polymer.

EXAMPLE 3

Experiments were performed to disperse a $CO_2$-insoluble dye into a biodegradable polymer (in a manner analogous to making pharmaceuticals). In one experiment, the 95:5 mixture of PCL and PVA of Example 1 was mixed with sodium fluorescein (dye content about 70%) in a 98:2 ratio. The mixture was charged into a one-gallon reactor 12. Reactor 12 was sealed, filled with $CO_2$ from source 16, and heated to 38° C. at a pressure of approximately 1600 psi, thereby rendering the $CO_2$ a supercritical fluid. The starting materials and supercritical fluid were maintained under these conditions while being mixed for 60 minutes using agitation device 34. The temperature then was raised to 65° C. at a pressure of 3000 psi while mixing continued for an additional 30 minutes. After the $CO_2$ was released, homogeneous, porous products were obtained. The experiment was repeated successfully, under the same process conditions, with the 67:33 mixture of PCL and PVA from Example 1.

EXAMPLE 4

Several mixtures of zinc stearate and calcium stearate in a 50:50 ratio were premixed and charged into a one-gallon reactor 12 that was filled with $CO_2$ from source 16. The materials were mixed for 60 minutes or more at a temperature of 120° C. and a pressure of approximately 3000 psi. Thereafter, the flush valve 26 was opened and the mixture was transferred through the conduit 13. The mixture was atomized into the vessel 14 to produce a finely divided powder. Although the ingredients in this Example were not polymers per se, the experiment demonstrates the usefulness of the blending concept.

Although the invention has been described in its preferred form with a certain degree of particularity, it will be understood that the present disclosure of the preferred embodiment has been made only by way of example, and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A method for manufacturing a polymer matrix comprising:

providing a reactor having a mixer;

charging the reactor with starting materials that include two or more polymers selected from the group consisting of thermoplastic polymers, thermoset polymers, or a combination thereof, and wherein said polymer is selected from the group consisting of hydroxy-methyl cellulose and its derivatives, polylactide-co-glycolide, polyethylene, polypropylene, polyvinyl chloride, polyvinyl alcohol, polyethylene-vinyl, acetate, polyenoiketone, polyacrylic acid, polycarbophil, polyacrylamides, poly-N-isopropyl acrylamide, polyacrylates, polyethylene glycol, polyglycolic acid, polylactic acid, poly-$\epsilon$-caprolactone, poly-3-hydroxybutyrate, polyortho esters, polyanhydrides, polyamino acids, pseudo-polyamino acids, polyamide-enamines, polyamido amines, polyurethanes, azopolymers, polydimethylsiloxane, and polyphosphazenes;

providing supercritical fluid in the reactor;

mixing the starting materials and the supercritical fluid in the reactor for a period of time sufficient to form a supercritical fluid slurry and wherein, the density of the supercritical fluid is equal to the density of the polymers;

reducing the pressure in the reactor to ambient; and recovering a homogeneous polymer matrix from the reactor.

2. The method of claim 1, wherein the supercritical fluid is selected from the group consisting of carbon dioxide, water, nitrous oxide, methane, ethane, ethylene, propane, pentane, benzene, methanol, ethanol, isopropanol, isobutanol, chlorotrifluoromethane, monofluoromethane, toluene, pyridine, cyclohexane, decalin, cyclohexanol, o-xylene, and tetralin.

3. The method of claim 1, wherein the step of providing supercritical fluid in the reactor is accomplished by charging a liquid into the reactor, and thereafter heating and pressurizing the reactor contents so that the liquid attains a supercritical state.

4. The method of claim 3, wherein the liquid is carbon dioxide.

5. The method of claim 4, wherein the carbon dioxide is heated to a temperature within the range of 0–127° C. and is pressurized to a pressure within the range of 290–14,500 psi.

6. The method of claim 1, wherein, during the step of mixing, the reactor is maintained at a temperature below the melting point of the starting materials.

7. The method of claim 1, wherein the step of mixing is accomplished by a blade or helical mixer.

8. The method of claim 7, herein the mixer is rotated at a speed within the range of 1–200 rpm.

9. A polymer matrix prepared by the method of claim 1.

10. A method for manufacturing a polymer matrix comprising:

providing a reactor having a mixer;

providing a receiving vessel and a conduit that connects the reactor and the receiving vessel;

charging the reactor with starting materials that include two or more polymers, selected from the group consisting of thermoplastic polymers, thermoset polymers, or a combination thereof, and wherein said polymer is selected from the group consisting of hydroxy-methyl cellulose and its derivatives, polylactide-co-glycolide, polyethylene, polypropylene, polyvinyl chloride, polyvinyl alcohol, polyethylene-vinyl, acetate, polyenolketone, polyacrylic acid, polycarbophil, polyacrylamides, poly-N-isopropyl acrylamide, polyacrylates, polyethylene glycol, polyglycolic acid, polylactic acid, poly-$\epsilon$-caprolactone, poly-3-hydroxybutyrate, polyortho esters, polyanhydrides, polyamino acids, pseudo-polyamino acids, polyamide-enamines, polyamido amines, polyurethanes, azopolymers, polydimethylsiloxane, and polyphosphazenes;

providing supercritical fluid in the reactor;

mixing the starting materials and the supercritical fluid in the reactor for a period of time sufficient to form a supercritical fluid slurry, and wherein, the density of the supercritical fluid is equal to the density of the polymers;

discharging the slurry into the receiving vessel through the conduit;

reducing the pressure in the receiving vessel to ambient; and recovering a homogeneous polymer matrix from the receiving vessel.

11. The method of claim 10, wherein the supercritical fluid is selected from the group consisting of carbon dioxide, water, nitrous oxide, methane, ethane, ethylene, propane, pentane, benzene, methanol, ethanol, isopropanol, isobutanol, chlorotrifluoromethane, monofluoromethane, toluene, pyridine, cyclohexane, decalin, cyclohexanol, o-xylene, and tetralin.

12. The method of claim 10, wherein the step of providing supercritical fluid in the reactor is accomplished by charging a liquid into the reactor, and thereafter heating and pressurizing the reactor contents so that the liquid attains a supercritical state.

13. The method of claim 12, wherein the liquid is carbon dioxide.

14. The method of claim 13, wherein the carbon dioxide is heated to a temperature within the range of 0–127° C. and is pressurized to a pressure within the range of 290–14,500 psi.

15. The method of claim 10, wherein, during the step of mixing, the reactor is maintained at a temperature below the melting point of the starting materials.

16. The method of claim 10, further comprising the step of providing an orifice in the conduit.

17. The method of claim 16, wherein the orifice has a diameter within the range of about 0.01 inch to about 0.10 inch.

18. The method of claim 10, further comprising the step of providing a nozzle having multiple openings in the conduit.

19. The method of claim 18, wherein the openings in the nozzle have a diameter within the range of about 0.01 inch to about 0.10 inch.

20. The method of claim 10, wherein the step of mixing is accomplished by a blade or helical mixer.

21. The method of claim 20, wherein the mixer is rotated at a speed within the range of 1–200 rpm.

22. A polymer matrix produced by the method of claim 10.

23. The method of claim 10, wherein, during the step of discharging the slurry into the receiving vessel through the conduit, the flow through the conduit is laminar.

* * * * *